United States Patent [19]

Parmar

[11] Patent Number: 5,135,235
[45] Date of Patent: Aug. 4, 1992

[54] MECHANICAL FACE SEALS
[75] Inventor: Amrat Parmar, Linton, England
[73] Assignee: Crane Packing Limited, United Kingdom
[21] Appl. No.: 383,635
[22] Filed: Jul. 24, 1989

Related U.S. Application Data

[63] Continuation of Ser. No. 110,361, Oct. 19, 1987.

[30] Foreign Application Priority Data

Oct. 23, 1986 [GB] United Kingdom ............... 8625391

[51] Int. Cl.$^5$ .............................................. F16J 9/00
[52] U.S. Cl. ................................. 277/26; 277/81 R; 277/96
[58] Field of Search ............. 277/22, 26, 81 R, 96, 277/96.1, 96.2, 41

[56] References Cited

U.S. PATENT DOCUMENTS

| | | | |
|---|---|---|---|
| 4,103,907 | 8/1978 | Inouye et al. | 277/96.1 |
| 4,212,475 | 7/1980 | Sedy | 277/96.1 |
| 4,281,839 | 8/1981 | Schoenmeyr | 277/96.2 X |
| 4,407,512 | 10/1983 | Trytek | 277/96.1 |
| 4,426,092 | 1/1984 | Wiese | 277/96.1 |
| 4,639,000 | 1/1987 | Warner | 277/41 |
| 4,691,927 | 9/1987 | Sudol et al. | |
| 4,776,759 | 10/1988 | Maskell et al. | 277/22 X |
| 4,792,146 | 12/1988 | Lebeck et al. | 277/26 |
| 4,850,599 | 7/1989 | Parmar | 277/26 |

FOREIGN PATENT DOCUMENTS

| | | | |
|---|---|---|---|
| 1065640 | 1/1984 | U.S.S.R. | 277/26 |
| 1555765 | 11/1979 | United Kingdom | 277/26 |

OTHER PUBLICATIONS

ASLE Transactions, vol. 23, 4, pp. 375–387: "A Mixed Friction Hydrostatic Mechanical Face Seal Model with Thermal Rotation and Wear"; May 3, 1989, A. O. Lebeck.

Soviet Union Inventions Illustrated, WK8526, Aug. 1985.

Primary Examiner—Thomas B. Will
Assistant Examiner—Scott W. Cummings
Attorney, Agent, or Firm—Davis, Bujold & Streck

[57] ABSTRACT

A rotary mechanical face seal includes first and second seal face members, the sealing face of one seal face member being urged into engagement with the sealing face of the other seal face member, said seal face members being such that when subjected to temperature gradients due to the generation of heat at the sealing faces, the sealing faces will remain substantially parallel in spite of any thermal distortion of the seal face members.

32 Claims, 1 Drawing Sheet

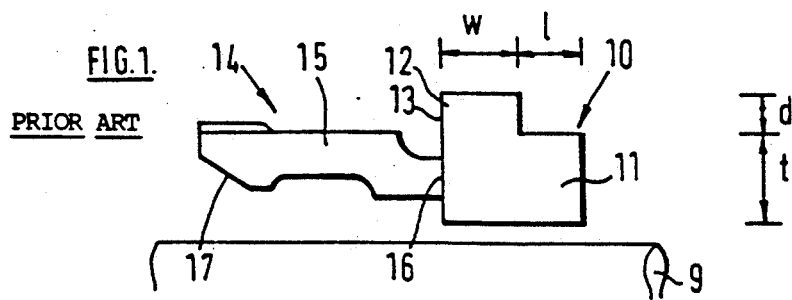
FIG. 1. PRIOR ART
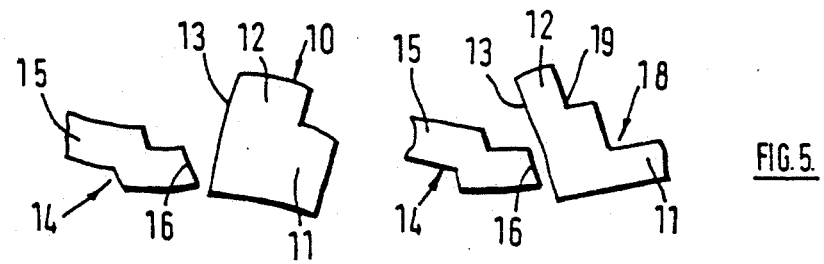
FIG. 4. PRIOR ART
FIG. 5.
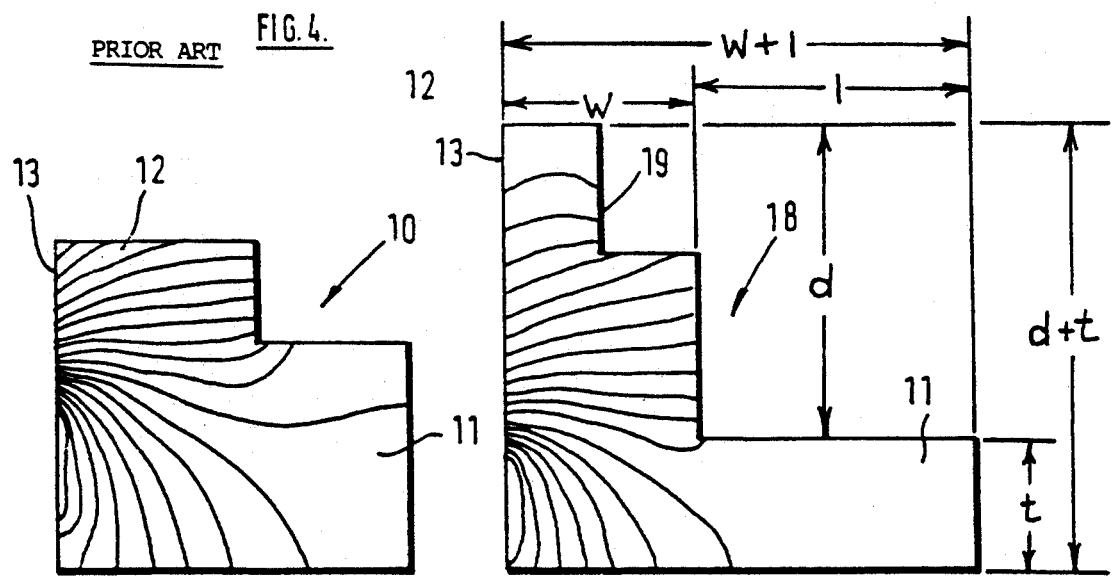
FIG. 2. PRIOR ART
FIG. 3.

MECHANICAL FACE SEALS

This is a continuation of application Ser. No. 110,361, filed Oct. 19, 1987.

BACKGROUND TO THE INVENTION

The present invention relates to mechanical face seals.

It is known to design mechanical face seals to take account of distortion of the seal face members due to the pressure differential which will be applied across them during service. Such pressure distortion controlled seals are covered by British Patent No. 1 555 765. However, these seal face members are subject to significant temperature gradients due to heat generation at their interface and the resulting thermal distortion may be greater than pressure distortion, causing the sealing faces to rotate out of the plane in which they should be to provide acceptable sealing conditions. With conventional mechanical face seals deformation of the seal face members will cause the sealing faces of both seal face members to rotate towards the service that is the sealed fluid. Misalignment of the sealing faces is consequently the sum of rotation of the two sealing faces.

In this specification "rotation" signifies deformation of the sealing face out of the plane, usually perpendicular to the axis of rotation, in which the sealing faces are designed to engage when not subjected to temperature gradients. Positive rotations denote deformation towards the service and negative rotations denote deformations away from the service.

SUMMARY OF THE INVENTION

According to one aspect of the present invention, a rotary mechanical face seal for producing a fluid tight seal between a pair of relatively rotatable components comprises; a first seal face member fixed rotationally with respect to one of said components and a second seal face member fixed rotationally with respect to the other component, means being provided to urge opposing sealing faces of the first and second seal face members into sealing engagement, said first and/or second seal face member distorting when subjected to a temperature gradient, so that the sealing faces of the seal face members remain substantially parallel over the operational range of heat transfer coefficients to which the seal is subjected.

In accordance with the present invention both of the seal face members may be designed to exhibit substantially zero thermal rotation over the large range of heat transfer coefficients under which they are designed to operate, typically 1,000 to 10,000 W/m²K, as calculated in accordance with the definition specified in the paper "An experimental and theoretical study of pressure and thermal distortions in a mechanical seal"—ASLE Transactions, Volume 29, pages 151 to 159 by T. G. Doust and Dr. A. Parmar, 1986. However, more preferably, a pair of seal face members will be matched with regard to their thermal rotation, so as to give a substantially zero net rotation over the range of heat transfer coefficients.

BRIEF DESCRIPTION OF THE DRAWINGS

Embodiments of the invention are now described, by way of example only, with reference to the accompanying drawing, in which:

FIG. 1 shows the axial cross section of a conventional face seal member and seat;

FIG. 2 illustrates typical thermal loading conditions of the conventional seat shown in FIG. 1;

FIG. 3 shows the axial cross-section of a seat matched in accordance with the present invention with respect to the seal face member illustrated in FIG. 1 and illustrating typical thermal loading conditions;

FIG. 4 illustrates the manner in which the seal face member and seat illustrated in FIG. 1 will distort when subjected to a temperature gradient; and FIG. 5 illustrates the manner in which the seal face member and seat illustrated in FIG. 3 will distort when subjected to a temperature gradient.

DESCRIPTION OF A PREFERRED EMBODIMENT

As illustrated in FIG. 1, a seat 10 comprises a cylindrical portion 11 with outwardly directed flange portion 12 at the end defining the sealing face 13. Seal face member 14 made of carbon, has a body portion 15 of generally cylindrical configuration, with a recessed sealing face 16 and an end portion 17 with conical bore.

The seat 10 would normally be located in a correspondingly recessed portion of a housing (not shown) and would be sealed thereto. The seal face member 14 would normally be mounted on a shaft 9, a sealing wedge (not shown) engaging the surface of the shaft 9 and the conical surface of portion 17 of the seal face member 14. The sealing wedge would be urged towards the seal face member 14, to force the wedge into sealing engagement with the seal face member 14 and the shaft 9, and to urge the sealing face 16 of the seal face member 14 into sealing engagement with the seal face 13 of seat 10.

During operation of the seal, relative rotation of the seal face member 14 and seat 10 will cause heat generation across the sealing faces 13 and 16. The seal face member 14 and seat 10 will thus be subjected to a temperature gradient and will distort so that the sealing faces 13 and 16 rotate relative to a plane normal to the shaft. The degree and direction of rotation will depend on the various dimensions of the seal face member 14 and seat 10, as well as the heat transfer coefficient under which they operate.

Typically, for a carbon seal face member 14 of the configuration shown in FIG. 1 and of nominal diameter 95 mm, at a heat transfer coefficient of 2,000 W/m²K, the thermal rotation rate of the face 16 will be +1.30 seconds/°C., the positive value indicating that rotation is towards the service that is away from the shaft 9, as indicated in FIG. 1.

The thermal rotation rate of the seat varies with the dimensions w, l, d and t. FIG. 2 illustrates the thermal loading for a conventional seat 10, showing the isothermals when the area of face 13 which engages face 16 of the seal face member 14 is at 100° C. and the heat transfer coefficient is 2000 W/m²K. As shown in FIG. 2 the average temperature of the bulk of material adjacent the sealing face 13 is higher than the average temperature of the bulk of material adjacent the axially opposite end of the seat 10. Consequently as a result of differential expansion axially across the seat 10, the sealing face 13 will rotate towards the service. A typical conventional seat 10, of nominal diameter 95 mm, for use with the seal face member 14 described above, would have dimensions W=8.3 mm; l=6.4 mm; d=4.2 mm; and t=9.3 mm. At a heat transfer coefficient of 2000 W/m²K the thermal rotation rate will be +0.8 seconds/°C.

As illustrated in FIG. 4, with the seat 10 and seal face member 14 of the conventional configuration described, thermal distortion of the sealing member will cause the sealing faces 13 and 16 to go out of parallel with consequent effects on the sealing efficiency. As faces 13 and 16 both rotate towards the service the effective thermal rotation rate will be the sum of the two, that is 2.1 seconds/°C.

By varying dimensions w, l, d and t the thermal rotation rate of the sealing face 13 of seat 10 may be made equal but opposite to the thermal rotation rate of the sealing face 16 of seal face member 14. If this is done, even though the faces 13 and 16 will rotate on thermal deformation of the seat 10 and seal face member 14, the faces will remain parallel to one another and the sealing efficiency will be unaffected.

For example, seat 18 illustrated in FIG. 3, has a nominal diameter of 95 mm and dimensions w=9 mm; l=13 mm; d=14.5 mm and t=6 mm. A recess 19 is provided round the periphery of flange portion 12 on the face thereof remote from the sealing face 13, the recess 19 being 4.5 mm wide and 6 mm deep. With this seat configuration, as illustrated by the isothermals, the average temperature of the bulk of material adjacent the sealing face 13 is lower than the average temperature of the bulk of material adjacent the axially opposite end of the seal 10. As a result of differential expansion axially across the seat 18, the sealing face 13 will rotate away from the service, that is in the opposite direction as face 16 of seal face member 14. With a seat 18 of the dimensions stated above, the thermal rotation rate at a heat transfer coefficient of 2,000 W/m²K will be −1.30 seconds/°C. As this is equal but opposite to that of the seal face member 14 (ie +1.30 seconds/°C.) the faces 13 and 16 will remain parallel in spite of thermal deformation of the seat 18 and seal face member 14, as illustrated in FIG. 5. While the thermal rotation rate of the seal face member 14 and seat 18 may not remain constant over the operating range of heat transfer coefficients for which the seal is designed, rotation of faces 13 and 16 will be in opposite directions but substantially equal and the relative rotation between the faces will remain substantially zero.

Various modifications may be made without departing from the invention. For example, while in the embodiment illustrated in FIG. 3, the dimensions of the seat have been selected so that the thermal rotation rate of the sealing face of the seat matches that of the seal face member, both the seal face member and seat may be designed to give substantially zero thermal rotation.

I claim:

1. A rotary mechanical face seal for producing a fluid-tight seal between a pair of relatively rotatable components comprising a first annular seal face member fixed rotationally with respect to one of said components, a second annular seal face member fixed rotationally with respect to the other of said components, said first and second seal face members each defining an annular radial sealing face in opposing relation to each other, said first seal face member having an annular cylindrical portion and an outwardly directed annular flange portion, said cylindrical portion defining said radial sealing face of said first seal face member, said sealing face defining an axial boundary of said first seal face member nearest said second seal face member, biasing means for biasing the opposing sealing faces of said first and second seal face members into engagement, said first and second seal face members being subject to distortion as a result of a temperature gradient created in each said member during operation, said distortion of each said member providing a thermal rotation of each said sealing face, said first seal face member being shaped and dimensioned to provide a thermal rotation rate for said sealing face thereof substantially equal in magnitude but opposite in direction to the thermal rotation of the sealing face of said second seal face member over the operating range of heat transfer coefficients to which the seal is subjected.

2. The rotary mechanical face seal according to claim 1 wherein an annular recess is provided around the periphery of said first seal face member flange portion in a face thereof remote from said radial sealing face.

3. The rotary mechanical face seal according to claim 1 wherein, as compared to a conventional first seal face member, the axial length of said cylindrical portion (W+l) is approximately 150% thereof, the radial width (t) of said cylindrical portion is approximately 63% thereof, the axial length (W) of said flange portion is approximately 109% thereof, and the radial width (d) of said flange portion is approximately 345% thereof.

4. The rotary mechanical seal according to claim 3 wherein an annular recess is provided around the periphery of said flange portion in a face thereof remote from said radial sealing face, said recess having an axial length of approximately 20% of the axial length (W+l) of said first seal face member and having a radial width which is approximately 29% of the radial width (d+t) of said first seal face member.

5. The rotary mechanical seal according to claim 4 wherein the axial length of said recess is approximately 50% of the axial length (W) of said flange portion and the radial width of said recess is approximately 41% of the radial width (d) of said flange portion.

6. The rotary mechanical face seal according to claim 1 wherein the nominal diameter of said first seal face member is approximately 95 mm. (millimeters), the axial length (W) of said first seal face member flange portion is approximately 9 mm., the axial length (W+l) of said first seal face member cylindrical portion is approximately 22 mm., the radial width (d) of said first seal face member flange portion is approximately 14.5 mm., and the radial width (t) of said first seal face member cylindrical portion is approximately 6 mm.

7. The rotary mechanical face seal according to claim 6 wherein an annular recess is provided around the periphery of said first seal face member flange portion in a face thereof remote from said radial sealing face, and said recess is defined by an axial length equal to approximately 4.5 mm. and a radial width equal to approximately 6 mm.

8. The rotary mechanical face seal according to claim 1 wherein said flange portion defines a radial face which is substantially planar with said sealing face of said cylindrical portion.

9. The rotary mechanical face seal according to claim 2 wherein said flange portion defines a radial face which is substantially planar with said sealing face of said cylindrical portion.

10. The rotary mechanical face seal according to claim 3 wherein said flange portion defines a radial face which is substantially planar with said sealing face of said cylindrical portion.

11. The rotary mechanical face seal according to claim 4 wherein said flange portion defines a radial face which is substantially planar with said sealing face of said cylindrical portion.

12. The rotary mechanical face seal according to claim 5 wherein said flange portion defines a radial face which is substantially planar with said sealing face of said cylindrical portion.

13. The rotary mechanical face seal according to claim 6 wherein said flange portion defines a radial face which is substantially planar with said sealing face of said cylindrical portion.

14. The rotary mechanical face seal according to claim 7 wherein said flange portion defines a radial face which is substantially planar with said sealing face of said cylindrical portion.

15. The rotary mechanical face seal according to claim 1 wherein said shape of said first seal face member provides for a predetermined rate of distortion of said first sealing face approximately equal to $-1.30$ seconds/°C. at a heat transfer coefficient of 2,000 $W/m^2K$.

16. The rotary mechanical face seal according to claim 2 wherein said shape of said first seal face member provides for a predetermined rate of distortion of said first sealing face approximately equal to $-1.30$ seconds/°C. at a heat transfer coefficient of 2,000 $W/m^2K$.

17. The rotary mechanical face seal according to claim 3 wherein said shape of said first seal face member provides for a predetermined rate of distortion of said first sealing face approximately equal to $-1.30$ seconds/°C. at a heat transfer coefficient of 2,000 $W/m^2K$.

18. The rotary mechanical face seal according to claim 4 wherein said shape of said first seal face member provides for a predetermined rate of distortion of said first sealing face approximately equal to $-1.30$ seconds/°C. at a heat transfer coefficient of 2,000 $W/m^2K$.

19. The rotary mechanical face seal according to claim 5 wherein said shape of said first seal face member provides for a predetermined rate of distortion of said first sealing face approximately equal to $-1.30$ seconds/°C. at a heat transfer coefficient of 2,000 $W/m^2K$.

20. The rotary mechanical face seal according to claim 6 wherein said shape of said first seal face member provides for a predetermined rate of distortion of said first sealing face approximately equal to $-1.30$ seconds/°C. at a heat transfer coefficient of 2,000 $W/m^2K$.

21. The rotary mechanical face seal according to claim 7 wherein said shape of said first seal face member provides for a predetermined rate of distortion of said first sealing face approximately equal to $-1.30$ seconds/°C. at a heat transfer coefficient of 2,000 $W/m^2K$.

22. The rotary mechanical face seal according to claim 15 wherein said second seal face member comprises carbon and is shaped and dimensioned to provide a rate of distortion of said sealing face of said second seal face member approximately equal to $+1.30$ seconds/°C. at a heat transfer coefficient of 2,000 $W/m^2K$.

23. The rotary mechanical face seal according to claim 21 wherein said second seal face member comprises carbon and is shaped and dimensioned to provide a rate of distortion of said sealing face of said second seal face member approximately equal to $+1.30$ seconds/°C. at a heat transfer coefficient of 2,000 $W/m^2K$.

24. A rotary mechanical face seal for producing a fluid-tight seal between a pair of relatively rotatable components comprising a first seal face member fixed rotationally with respect to one of said components and a second seal face member fixed rotationally with respect to the other component, means being provided to urge opposing sealing faces of the first and second seal face members into engagement, said first seal face member being shaped and dimensioned to distort when subjected to a temperature gradient such that the sealing faces of the seal face members remain substantially parallel over the operational range of heat transfer coefficients to which the seal is subjected.

25. A method of making a rotary mechanical seal for producing a fluid tight seal, said seal having a first annular seal face member fixed rotationally with respect to one of said components, a second annular seal face member fixed rotationally with respect to the other of said components, said first and second seal face members each defining an annular radial seal face in opposing relation to each other, said first seal face member having an annular cylindrical portion and an outwardly directed annular flange portion, said cylindrical portion defining said radial sealing face of said first seal face member, said sealing face defining an axial boundary of said first seal face member nearest said second seal face member, biasing means for biasing the opposing sealing faces of said first and second seal face members into engagement, said first and second seal face members being subject to distortion as a result of a temperature gradient created in each said member during operation, said distortion of each said member providing a thermal rotation of each respective sealing face, the method comprising the steps of determining the thermal rotation rate of said second seal face member sealing face, providing a shape and selecting the dimensions for said first seal face member to provide said sealing face of said first seal face member with a thermal rotation rate equal in magnitude but opposite in direction to that of said sealing face of said second seal face member.

26. The method according to claim 25 wherein said step of shaping and selecting further comprises selecting dimensions W, t, W+1 and d to provide the desired thermal rotation rate of said sealing face of said first seal face member, wherein:

W = approximately 109% of the axial length of the flange portion of a conventional first seal face member, t = approximately 63% of the radial width of the cylindrical portion of a conventional first seal face member, W+1 = approximately 150% of the axial length of the cylindrical portion of a conventional first seal face member, d = approximately 345% of the radial width of the flange portion of a conventional first seal face member.

27. The method according to claim 25 with the added step of providing a recess around the periphery of said flange portion of said first seal face member in a face thereof remote from said radial sealing face.

28. The method according to claim 26 further comprising the step of providing a recess around the periphery of said flange portion of said first seal face member in a face thereof remote from said radial seal face.

29. The method of making a rotary seal according to claim 28 wherein said step of providing a recess further comprises providing a recess having an axial length of approximately 50% of the axial length (W) of said flange portion and a radial width of approximately 41% of the radial width (d) of said flange portion.

30. The method according to claim 25 wherein said step of shaping and selecting further comprises selecting dimensions W, t, W+1, and d to provide the desired thermal rotation rate of said sealing face of said first seal face member where:

W is the axial length of said flange portion of said first seal face member and equals approximately 9 mm.;

d is the radial width of said flange portion and equals approximately 14.5 mm.;

t is the radial width of said cylindrical portion and equals approximately 6 mm.;

W+1 is the axial length of said cylindrical portion and is equal to approximately 22 mm.

31. The method according to claim 30 further comprising the step of providing a recess around the periphery of said flange portion of said first seal face member in a face thereof remote from said radial sealing face.

32. The method according to claim 31 wherein said step of providing a recess further comprises providing a recess having an axial length equal to approximately 4.5 mm. and a radial width equal to approximately 6mm.

* * * * *